United States Patent
Choi et al.

(10) Patent No.: US 7,733,886 B2
(45) Date of Patent: Jun. 8, 2010

(54) BURST DATA RECEPTION METHOD AND APPARATUS IN EPON

(75) Inventors: Hyun Kyun Choi, Daejeon (KR); Yool Kwon, Busan (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 313 days.

(21) Appl. No.: 11/633,978

(22) Filed: Dec. 5, 2006

(65) Prior Publication Data

US 2007/0140694 A1   Jun. 21, 2007

(30) Foreign Application Priority Data

Dec. 8, 2005   (KR) .................. 10-2005-0120234
Jul. 4, 2006   (KR) .................. 10-2006-0062705

(51) Int. Cl.
*H04J 3/06* (2006.01)
*H04J 14/00* (2006.01)
*H04L 12/28* (2006.01)
*H04B 10/20* (2006.01)

(52) U.S. Cl. .................. 370/401; 370/503; 398/58; 398/66

(58) Field of Classification Search .............. 370/398, 370/350, 503, 401; 398/58, 66
See application file for complete search history.

(56) References Cited

U.S. PATENT DOCUMENTS

2003/0142693 A1   7/2003   Umayabashi et al.
2003/0194243 A1   10/2003   Doh et al.
2003/0194244 A1   10/2003   Doh et al.
2003/0202803 A1   10/2003   Doh et al.
2004/0095884 A1*   5/2004   Lee et al. ................ 370/235
2004/0109688 A1*   6/2004   Kim et al. ................ 398/68
2004/0141745 A1*   7/2004   Han et al. ................ 398/58
2004/0184474 A1   9/2004   Kim et al.
2005/0078682 A1*   4/2005   Kim et al. ............ 370/395.5
2007/0014575 A1*   1/2007   Kramer et al. .......... 398/71

FOREIGN PATENT DOCUMENTS

JP   2003-224573 A   8/2003
JP   2003-298609 A   10/2003
JP   2003-318680 A   11/2003
JP   2003-332987 A   11/2003
JP   2003-332989 A   11/2003

(Continued)

OTHER PUBLICATIONS

"IPACT: A Dynamic Protocol for an Ethernet PON (EPON)." Glen Kramer et al. IEEE Communications Magazine, Feb. 2002. pp. 74-80.

*Primary Examiner*—Alpus H Hsu
*Assistant Examiner*—Saad Hassan
(74) *Attorney, Agent, or Firm*—Ladas & Parry LLP (57) ABSTRACT

A method and apparatus for receiving burst data in an OLT of an EPON are provided. The method includes the steps of: a) receiving burst data from the plurality of ONUs; b) generating a multipoint control protocol (MPCP) LOS signal for reducing a synch time of the burst data; c) reducing the synch time in response to generation of the MPCP LOS signal; and d) recovering the received burst data by performing a code-group sort in a period where the MPCP LOS signal is not generated.

10 Claims, 5 Drawing Sheets

FOREIGN PATENT DOCUMENTS

| | | |
|---|---|---|
| JP | 2004-289827 A | 10/2004 |
| JP | 2005-005772 A | 1/2005 |
| KR | 1020030001709 | 1/2003 |
| KR | 1020030073473 | 9/2003 |
| KR | 1020030073484 | 9/2003 |
| KR | 1020040000271 | 1/2004 |
| KR | 1020040047573 | 6/2004 |
| KR | 1020040050337 | 6/2004 |
| KR | 1020040057027 | 7/2004 |
| WO | 2006/124532 A2 | 11/2006 |

* cited by examiner

PRIOR ART

FIG. 6

BURST DATA RECEPTION METHOD AND APPARATUS IN EPON

RELATED APPLICATION

The present application is based on, and claims priorities from, Korean Application Number 2005-120234, filed Dec. 8, 2005 and Korean Application Number 2006-62705, filed Jul. 4, 2006, the disclosure of which is hereby incorporated by reference herein in its entirety.

BACKGROUND OF THE INVENTION

1. Field of the Invention

The present invention relates to a method and apparatus for receiving and processing burst data in an optical line terminal (OLT) of an Ethernet passive optical access network, and more particularly, to a method and apparatus for receiving and processing burst data for improving a burst mode receiving performance in an optical line terminal (OLT).

2. Description of the Related Art

As the number of Internet users using wireless communication has abruptly increased, high-speed Internet technologies have been evolved to provide faster Internet services to users. A wireless local area network (LAN) is one of representative technologies for providing high speed Internet services to users. The wireless LAN has shortcomings of a large gap between a wide area network and an end user and a bottleneck problem of a bandwidth at the end users. In order to overcome the bottleneck program of the bandwidth, a passive optical network (PON) was introduced recently. Such a PON technology may be classified into an ATM PON (APON) and an Ethernet PON (EPON). The EPON technology is a control chip technology that allows users to access a Fiber to the Home (FTTH) network, which is capable of providing various communication services including Internet, Internet TV, digital TV and telephone with affordable cost, through one optical fiber.

Figure 1:
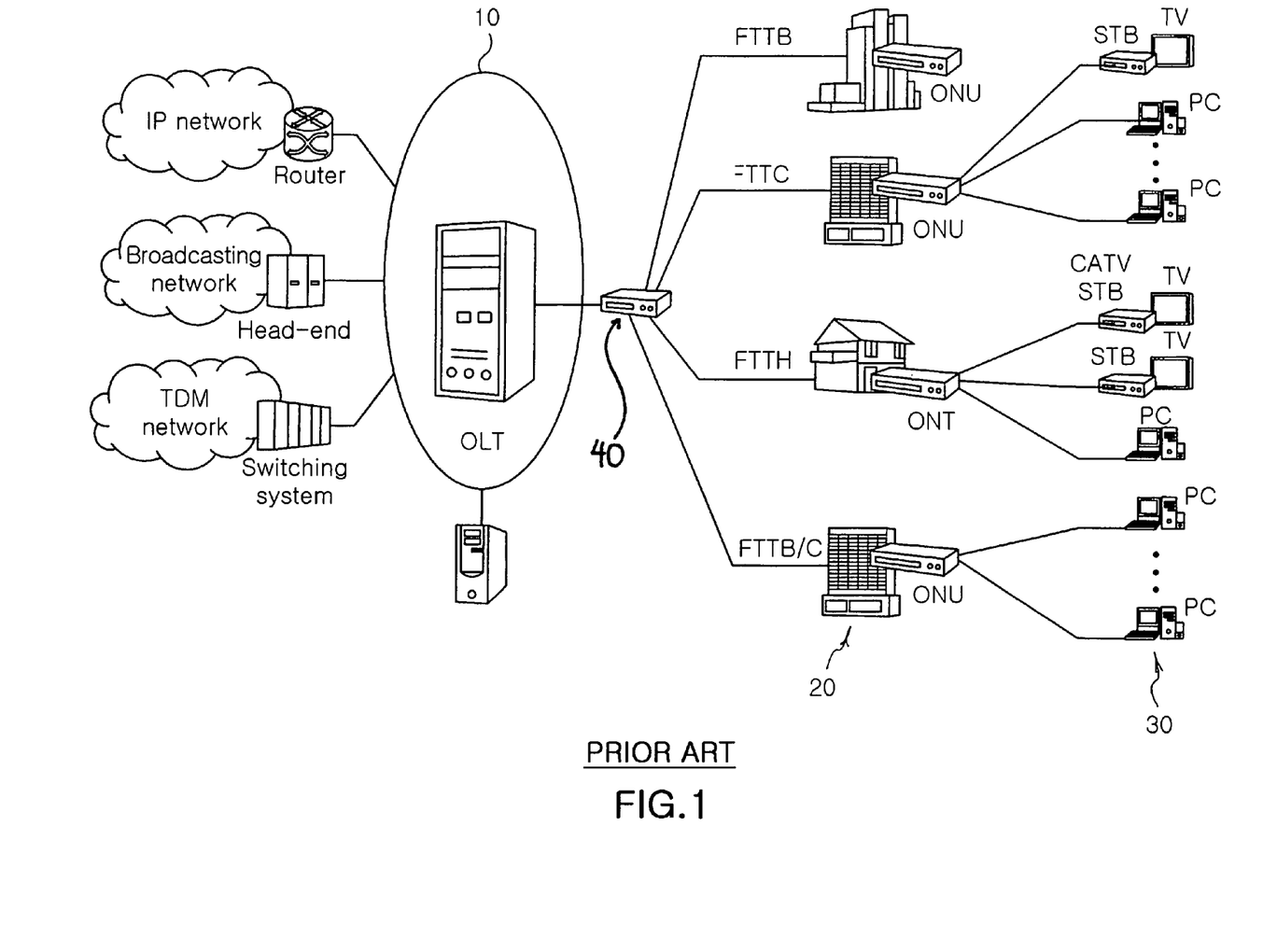
FIG. 1 is a block diagram illustrating an Ethernet passive optical network according to the related art.

FIG. 1 is a diagram illustrating a structure of Ethernet passive optical network (EPON) according the related art. The EPON is a system that transfers a signal to an end user through an optical cable network. The EPON is classified into FTTC, FTTB and FTTH according to a location of termination.

Referring-to FIG. 1, the EPON includes an optical line terminal (OLT) 10 cooperated with a communication service provider side such as an IP network, a broadcasting network, or a TDM network, and an optical network unit (PNU) 20 connected to a user terminal 30 placed at a user end of an optical access network, such as STB or PC. The EPON uses an optical fiber and generally has a point-to-multipoint tree structure. An optical star coupler/splitter 40 may split an optical signal transferred to an Ethernet passive optical network system according to whether the light thereof is upstream or downstream. The split signals are transferred through a plurality of optical fibers, or the split signals are coupled and transferred through one optical fiber. As an example, a method of transmitting data in EPON will be described with reference to FIG. 2.

Figure 2:
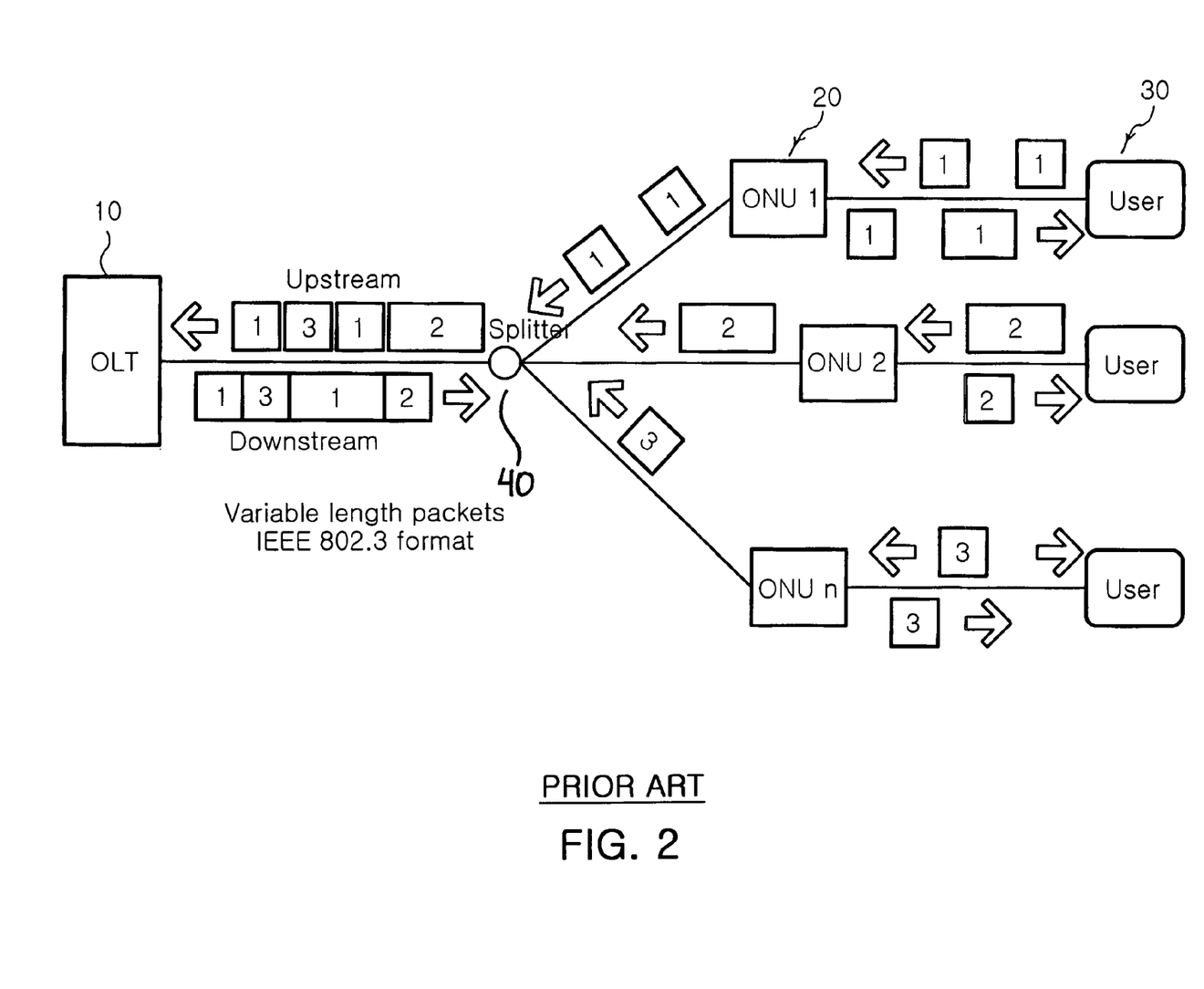
FIG. 2 is a block diagram illustrating a method for transmitting data in an Ethernet passive optical network according to the related art.

The EPON transmits data using an Ethernet frame as a transmission unit. In an upstream path, each of ONUs 20 is allocated to a time slot dynamically or fixedly, and transmits data to a common OLT 10. An optical star coupler 40 multiplexes the data outputted from each of the ONUs 20 and transmits them to the OLT 10. ON the contrary, in the downstream path, when the OLT 10 transmits a downstream, the optical star coupler 40 inverse multiplexes the downstream and transmits them to each of the ONUs 20.

The OLT 10 recovers burst data transmitted in a burst mode from an ONU 20 through an upstream. Since the EPON is a technology for high speed Internet service, the Internet speed would be significantly influenced if a time of restoring burst data delays. Such a delay also wastes the bandwidth of the upstream channel. The delay is mainly caused by a time required for restoring transmitting data from an ONU at an OLT, and a laser on/off time of an ONU. A sum of such times except the time of transmitting data is a guard time.

Therefore, it is required to reduce a clock and a data restoring time when the OLT 10 receives burst data. However, a conventional EPON only considers the allocation of synch times.

Generally, a receiver of an OLT in an EPON system uses an Ethernet SerDes chip. According to the type of the Ethernet SerDes chip and a method of using the same, a CDR time of about 200 nano seconds to about several nano seconds is required. The CDR time becomes a synch time by being added to an OLT optical receiving level recovery time. If the CDR time is significantly lengthened, the synch time becomes lengthened, accordingly. Also, if the synch time becomes lengthened, a upstream band would be wasted as much as the lengthened synch time, and if the number of branches increases, the overhead becomes also bigger as much as the increased number of the branches.

SUMMARY OF THE INVENTION

Accordingly, the present invention is directed to a method and apparatus for receiving and processing burst data in an OLT that substantially obviates one or more problems due to limitations and disadvantages of the related art.

An object of the present invention is to provide an apparatus and method for receiving and processing burst data for improving upstream band efficiency by shortening a receiving recovery time (synch time) at an optical line terminal of an Ethernet passive optical network (EPON).

Another object of the present invention is to provide an apparatus and method for processing burst data for shortening a receiving recovery time (synch time) by disposing a SerDes chip where a LOS signal generated from a MPCP at an OLT is applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method and apparatus for receiving and processing burst data in an optical line terminal (OLT) of an Ethernet passive optical access network.

According to an aspect of the present invention, there is provided a method for processing burst data received from a plurality of optical network units (ONU) at a optical line terminal (OLT) in an Ethernet passive optical access network (EPON) formed of the OLT and the plurality of ONUs, including: receiving burst data from the plurality of ONUs; generating a multipoint control protocol (MPCP) loss of signal (LOS) signal for reducing a synch time of the burst data; reducing the synch time in response to generation of the MPCP LOW signal; and recovering the received burst data by performing a code-group sort in a period where the MPCP LOS signal is not generated.

According to another aspect of the present invention, there is provided an apparatus for processing a burst data in an Ethernet passive optical network, including: an optical module for receiving burst data of different optical power levels from a plurality of optical network units (ONU) and converting an optical signal of the burst data to an electric signal; an access controller for generating a multipoint control protocol (MPCP) LOS signal for reducing a synch time of the burst data; and a SerDes unit for reducing a synch time when the MPCP LO signal is generated, and recovering the received burst data by performing a code-group sort in a period where the MPCP LOS signal is not generated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

An apparatus and method for receiving burst data according to an embodiment of the present invention will be described with an Ethernet passive optical network (EPON) applied. As shown in FIG. 2, an optical line terminal (OLT) receiving burst data transmitted from optical network units (ONU) through an upstream channel will be described. Operations of an OLT for reducing a receipt and recovery time by disposing a SerDes chip at an OLT will be described. The time for recovering stable data from a burst optical signal at an OLT is a level recovery time of an optical module and a clock and data recovery (CDR) time in a SerDes chip. The sum of them is a synch time. Since the CDR time is about several hundreds nano-seconds to about several nano-seconds in generally, the CDR time must be reduced to improve the upstream band efficiency.

At first, the upstream and downstream data transmission of an EPON system will be briefly described again for convenience to describe the embodiment of the present invention.

Referring to FIG. 2, the EPON system has a point to multipoint structure formed of an OLT 10, and a plurality of ONUs 20 through a passive splitter 40.

The OLT 10 broadcasts downstream-frames transmitted to the plurality of ONUs 20 as a variable length packet of IEEE 802.3 format. Herein, each frame can be processed by a predetermined ONU 20 or all of ONUs 20, and the processed frames are transferred to the user of ONU 20.

The plurality of ONUs 20 transmit upstream-frames only for a predetermined time assigned by the OLT 10 not to make collision with that transmitted from adjacent ONUs 20 based on a time division multiple access (TDMA) scheme. Therefore, the plurality of ONUs 20 transmit data in a burst mode. Accordingly, the OLT 10 should have a capability to receive the burst data transmitted from the plurality of ONUs 20.

To transmit the upstream-data, a laser on/off time in an ONU 20, and a level recovery time, a CDR time, and a code group sorting time of an OLT 10 are also required beside the time of transmitting real data. In order to effective use a bandwidth, that is, to improve the usability of the upstream transmission band, these times are required to be reduced.

Hereinafter, an apparatus and method for receiving burst data at an OLT in consideration of these times according to an embodiment of the present invention will be described with reference to accompanying drawings. For convenience, an apparatus for receiving burst data according to the related standard will be described at first, and then an apparatus for receiving burst data according to an embodiment of the present invention will be described.

Figure 3:
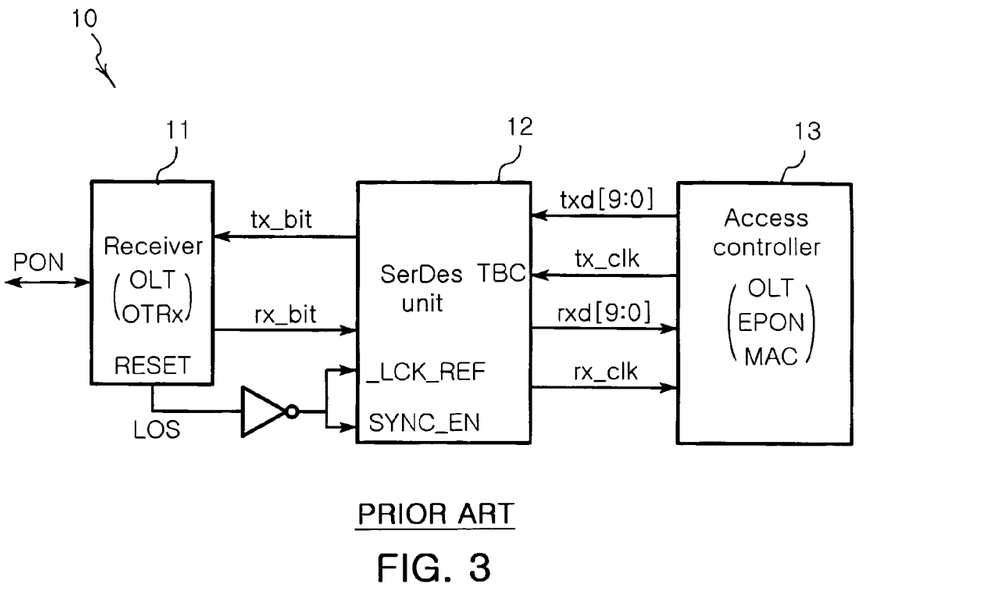
FIG. 3 is a block diagram illustrating a conventional optical line terminal (OLT) shown in FIG. 1.

FIG. 3 is a block diagram illustrating a conventional optical line terminal (OLT) shown in FIG. 1.

Referring to FIG. 3, the conventional OLT 10 includes a receiver (OLT OTRx) 11 which is an optical module, a SerDes unit (PMA) 12, and an access controller (OLT EPON MAC) 13, which are embodied as a chip.

The receiver 11 generates a LOS signal to the SerDes unit 12 when receiving burst data from each of the ONUs 20. Herein, a gap is present between burst signals when receiving the burst data, thereby generating a period without an optical signal.

Generally, the SerDes unit 12 tries to lock a PLL for abnormal signal even in the no-optical signal period. Therefore, a clock may seriously change. Since a time of locking the PLL becomes significantly lengthened in receiving a next ONU burst data after releasing the locked PLL, the CDR time becomes lengthened as much as the lengthened time of locking the PLL. Therefore, the SerDes unit 12 shortens theses times by receiving the LOS signal from the optical module. That is, when the SerDes unit 12 receives the LOS signal from the optical module, the SerDes unit 12 locks a TBC, which is a transmission clock, in the LOS period in order to generate a stable receipt clock instead of locking a receiving signal from the receiver 11. Afterward, the SerDes unit 12 has a fast CDR lock characteristic.

The SerDes unit 12 receives the LOS signal from the optical module receiver 11 through a LCK_REF pin or a SYNC_EN pin. When the LCK_REF pin is in an inactive state as an active low signal, a receiving PLL is normally driven, thereby locking serial data from the receiver 11. When the LCK_REF pin is in an active state, a transmitting clock (TBC) from the access controller 13 is locked. On the contrary, if the SYNC_EN(EN_CDET) pin receives an Enable Comma Detect signal that sorts code-group in an no-LOS signal period.

As described above, the conventional OLT is not suitable for receiving burst data in an EPON because the LOS signal of the optical module does not have a fast operating characteristic as like the real optical signal and have a slow response characteristics.

In a MPCP of an OLT, a burst data receiving time can be obtained from an ONU. Therefore, in the present embodiment, a lost of signal (LOS) signal is generated to be identical to the real receiving optical signal using the obtained burst data receiving time. In consideration of the laser on/off time of an OLT optical module and a level recovery time of an OLT optical module, the MPCP LOS signal must be generated to extend a delay or a LOS period. When a reset signal is required at an EPON OLT optical module, an OLT MPCP reset signal is generated and transmitted to an OLT optical module, thereby reducing the level recovery time.

Figure 4:
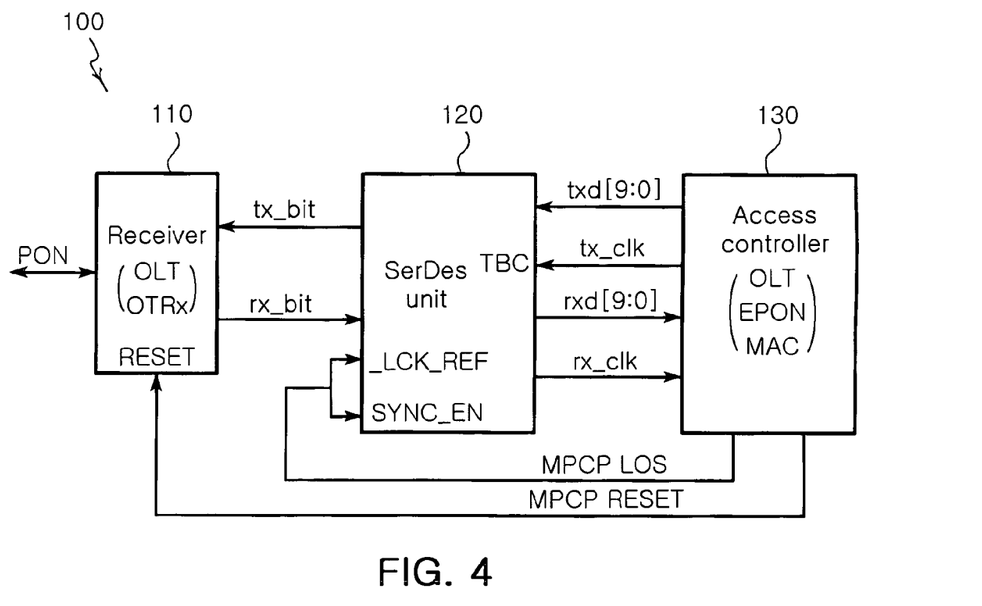
FIG. 4 is a block diagram illustrating an OLT according to an embodiment of the present invention.

FIG. 4 is a block diagram illustrating an OLT according to an embodiment of the present invention.

The OLT 100 according to the present embodiment is described with reference numerals different from the conventional OLT 10 in order to clearly distinguish the OLT according to the present embodiment from the conventional OLT 10.

Referring to FIG. 4, the OLT 100 of EPON includes a receiver (OLT OTRx) 110 that is an optical module, a serialization and de-serialization (SerDes) 120 and an access controller (OLT EPON MAC) 130, which are formed as a chip.

The EPON provides a TDMA scheme for an upstream channel. A traffic collision may be arisen because a plurality of ONUs 20 may transmit Ethernet frames at the same time when an ONU 20 transmit Ethernet frames to the OLT 10. In order to avoid the traffic collision, the EPON provides a scheme of sharing the upstream channel through a time division multiple access (TDMA) using a MPCP. Therefore, the OLT 100 of the EPON applies the OLT MPCP to the access controller 130.

The optical module receiver 110 receives burst data of different optical power levels from each of the ONUs 20, recovers the level and converts the optical signal to an electric signal. When the optical module receiver 110 receives the burst data, the optical module receiver 110 generates a receiving bit (rx_bit) signal to the SerDes unit 120, and receives a transmitting bit (tx_bit) signal from the SerDes unit 120.

The SerDes unit 120 is a chip of a PMA layer, and recovers data and a clock. Also, the SerDes unit 120 performs a code-group sort. The SerDes unit 120 receives a receiving bit (rx_bit) signal from the receiver 110, and transmits a transmitting bit (tx_bit) signal to the receiver 110 in response to a transmitting clock (tx_clk, TBC) generated from the access controller 130. The SerDes unit 120 receives a MPCP LOS signal from the access controller 130. The MPCP LOS signal inputs to a LOCK_REF pin or a SYNC_EN pin as like the LOS signal of the optical module in FIG. 3.

When the MPCP LOS signal is generated, the SerDes unit 120 inputs a signal to the LCK_REF pin to drive a receiving PLL normally in case of the inactive state, thereby locking serial data from the receiver 11, and to lock a transmitting-clock (TBC) from the access controller 13 in case of the active state.

On the contrary, if the MPCP LOS signal is not generated, the SerDes unit 120 inputs a signal to the SYNC_EN(EN_C-DET) to perform a code-group sort in an no-LOS signal period.

The access controller 130 generates the MPCP LOS signal to shorten the CDR lock time and transmits the MPCP LOS signal to the SerDes unit 120.

The access controller 130 uses an OLT MPCP that is a protocol for control in a media access control (MAC) layer.

Using the OLT MPCP, not only a gap between burst data but also a starting point of the next burst can be obtained when receiving the burst data from each of the ONUs 20. It is because the OLT MPCP sets the ONUs 20 to transmit burst data to an OLT only at a time assigned by the OLT MPCP. Therefore, the access controller 130 can generate the OLT MPCP LOS signal suing the OLT MPCP.

The access controller 130 generates a MPCP RESET Signal when the optical module receiver 110 requires a reset signal, and transmits the MPCP RESET signal to the receiver 110. Accordingly, the receiver 110 can uses the MPCP RESET signal to reduce the time of recovering a burst level.

As described above, the CDR lock time can be reduced and the receiving clock is prevented from being seriously tilted by generating the MPCP LOS signal at the OLT 100 instead of the LOS signal of the optical module. Therefore, the burst data receiving performance of the OLT can be improved. Such a performance improvement is clearly shown in a timing diagram of FIG. 5.

Figure 5:
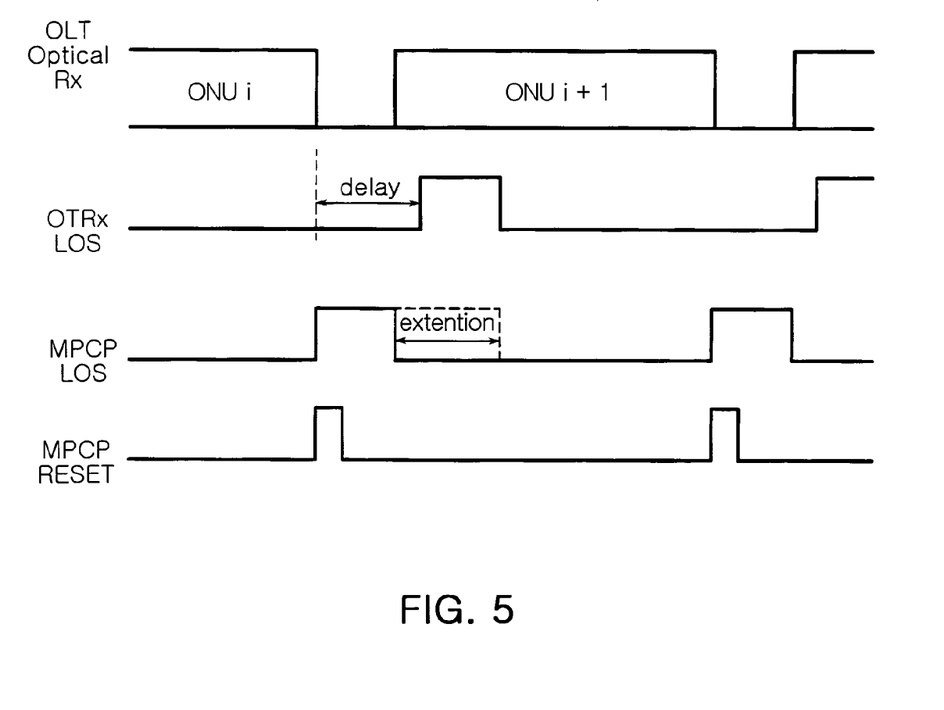
FIG. 5 is a timing diagram illustrating signals generated from an optical line terminal according to an embodiment of the present invention.

As shown in FIG. 5, a receiving clock (OLT Optical Rx) signal is generated by receiving burst data at the optical module receiver 110. Herein, the conventional OLT 10 generates an optical module LOS (OTRx LOS) signal. However, a delay is made by a gap generated after generating a first clock (ONU i) of the receiving clock signal. Therefore, the conventional OLT 10 generates the LOS signal after the second clock (ONU i+1) is generated, which was generated after the delay.

On the contrary, as shown in FIG. 5, the access controller 130 according to the present embodiment generates the MPCP LOS signal at a time of starting the gap after the first clock (ONU i) of the receiving clock signal is generated. The OLT 100 can extend a delay or a LOS period in consideration of the laser on/off time of the ONT optical module and the level recovery time of the OLT optical module by including an extension in the MPCP LOS signal. Also, the MPCP RESET signal is generated at the same time of generating the MPCP LOS signal.

According to the standard of EPON, the sync time information of the OLT 10 exchanges with ONUs when a new ONT 20 is registered, and the synch time is used with same value after the synch time is set in a registration procedure, which is a discovery procedure. Such a synch time can be reduced by applying the above described scheme to the OLT 100. However, the new ONT 20 may not be appropriately registered because of errors generated when receiving burst data from the ONU 20, which are caused by the lack of the synch time.

As described above, an accurate burst data transmission starting time must be obtained from ONUs to apply a MPCP LOS signal or a MPCP RESET signal according to the present embodiment. It is possible if the ONUs are previously registered. However, the synch time cannot be set shortly by applying the MPCP LOS signal or the MPCP RESET signal when a new ONU requests to be registered. Therefore, in the present embodiment, the synch time is set differently when an OLT and ONUs are registered in an EPON system.

Hereinafter, a registration procedure according to an embodiment of the present invention, which manages a synch time shortly by applying the MPCP LOS signal or the MPCP RESET Signal when the new ONU is registered, will be described with accompanying drawings.

Figure 6:
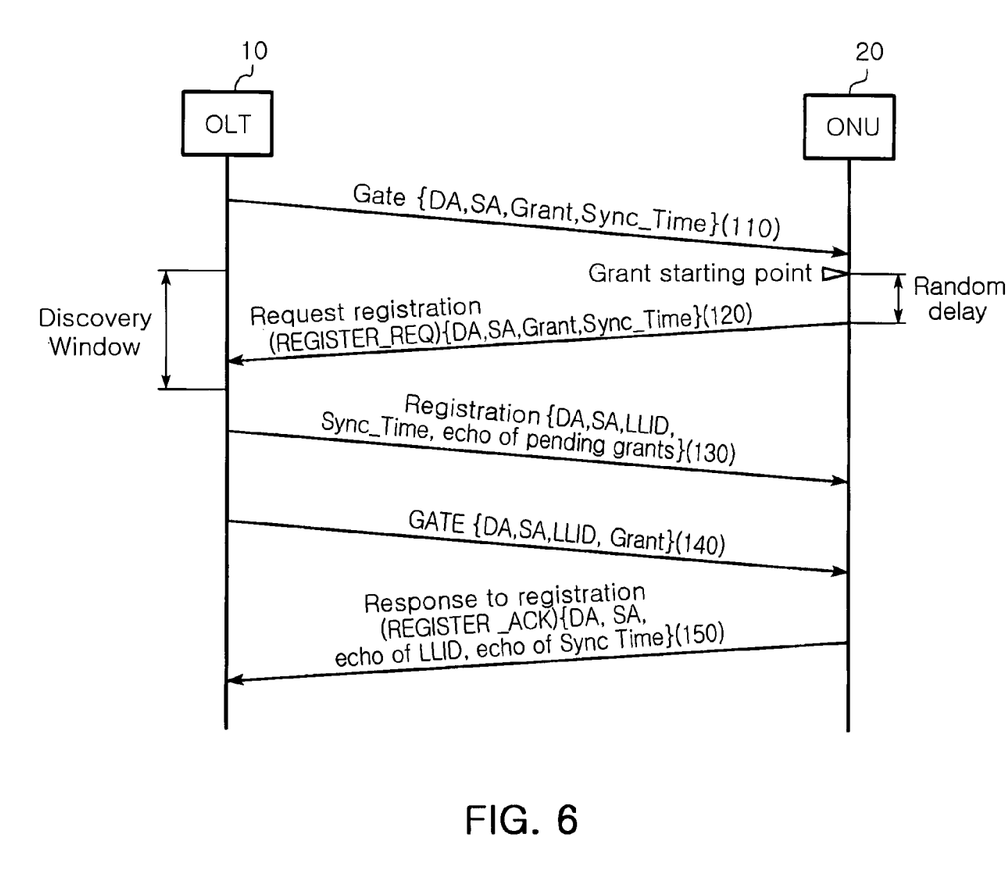
FIG. 6 is a flowchart illustrating a discovery procedure for managing a synch time in an Ethernet passive optical access network according to an embodiment of the present invention.

FIG. 6 is a flowchart illustrating a recovery procedure for managing a synch time in an Ethernet passive optical access network according to an embodiment of the present invention.

Referring to FIG. 6, at step S210, an OLT 100 transmits a GATE message to an ONU 20. The GATE message includes information about DA, SA, Grant, Sync_Time1. Then, the ONU 20 generates a random delay time from a Grant starting point, and responses to the GATE message after the random delay time. Accordingly, the access controller 130 of the OLT 100 cannot be aware of a time of receiving burst data from the ONU 20. Therefore, the OLT 100 sets the first synch time (Sync_Time1) included in the GATE message to be different from the second synch time (Sync_Time2) included in a register message. That is, at the beginning, the first synch time is set to be longer for the registering procedure, and then the second synch time is set to shorter for transmitting data after completing the registration.

After the random delay time, the OLT 100 receives a register request message (REGISTER_REQ) from the ONU 20 at step S220. The register request message includes DA information, SA information, Grant information, and Pending grants information.

At step S230, the OLT 100 transmits the REGISTER message to the ONU 20. The REGISTER message includes DA information, LLID information, Sync_Time 2 information, and echo of pending grants information. Then, the ONU 20 sets and stores information included in the received REGISTER message.

At step S240, the OLT 100 transmits a GATE message to the ONU 20. The GATE message includes DA information, SA information, LLID information and Grant information. Then, the OLT 20 a REGISTER_ACK message as a response for the GATE message. At step S250, the OLT 100 receives the register response message transmitted from the ONU 20. The register response message includes DA information, SA information, echo of LLID information, and echo of Sync_Time information.

As described above, when a new ONU requests the registration, the chip controller cannot be accurately aware of a time of starting burst data transmission using the MPCP at the registration initial period because the new ONU transmits burst data within a time set by the chip controller (OLT MPCP). Therefore, a synch time for receiving a burst data must be set longer. In the present embodiment, the first synch time for registration procedure is set to be sufficiently long, and then the synch time is reset to be shorter after it can obtain the time for starting the burst data transmission from the ONU. That is, the registering procedure is performed by setting the first synch time differently from the second synch time.

As described above, in the present invention, the access controller of the OLT generates the MPCP LOS signal and the MPCP RESET signal using the OLT MPCP instead of the LOS signal of an optical module, which has a slow response characteristic. Since the OLT MPCP is identical to the real receiving optical signal, the burst data receiving time can be obtained from the ONU. By applying the MPCP LOS signal and the MPCP RESET signal into the SerDes chip, the receiving recovery time can be shortened through the fast operating characteristic as like the real optical signal.

Also, the synch time information exchanges between the OLT and the ONU by setting the firstly synch time for the registration procedure and the second synch time for burst data transmission, differently in the present invention. Therefore, the synch time can be reduced, and, at the same time, the lack of the synch time problem generated from the OLT using the MPCP LOS can be solved.

As described above, in the present invention, the synch time, that is, the receiving recovery time, can be reduced through the fast operating characteristics as like the optical signal by generating the MPCP LOS signal and the MPCP RESET signal using the OLT MPCP at the OLT and applying them into the SerDes chip. Therefore, the upstream band efficiency and the burst data receiving performance can be improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for processing burst data received from a plurality of optical network units (ONU) at an optical line terminal (OLT) in an Ethernet passive optical access network (EPON) formed of the OLT and the plurality of ONUs, comprising:
   receiving burst data from the plurality of ONUs;
   obtaining, using an OLT multipoint control protocol (MPCP), a burst data receiving time, the burst data receiving time being a time at which burst data is to be received by the OLT;
   generating an MPCP loss of signal (LOS) signal, which signifies a period without a burst data optical signal, for reducing a synch time of the burst data received at the OLT, the synch time being a set time during which the OLT recovers data from a burst data signal received at the OLT, and the MPCP LOS signal being generated according to the obtained burst data receiving time;
   reducing the synch time in accordance with generation of the MPCP LOS signal; and
   recovering the received burst data by performing a code-group sort in a period where the MPCP LOS signal is not generated.

2. The method of claim 1, further comprising:
   generating a MPCP RESET signal for reducing a level recovery time of an optical module of the OLT and outputting the MPCP RESET signal to the optical module.

3. The method of claim 1, wherein obtaining a burst data receiving time and generating a multipoint control protocol (MPCP) LOS signal for reducing a synch time of the burst data includes:
   checking the plurality of ONUs and a preset burst data transmission time;
   obtaining a start point at which a next burst data is to be received by the OLT after a previous burst data and obtaining a gap between the previous and next burst data signals when receiving the burst data; and
   generating the MPCP LOS signal using the obtained gap and start point to determine a start point and duration of enabling the MPCP LOS signal.

4. The method of claim 1, further comprising:
   registering a new ONU using different synch times for receiving burst data from the new ONU, each of the different synch times being utilized for the same new ONU, wherein the different synch times of the new ONU are set differently according to whether a burst data start point of burst data to be received from the new ONU has been obtained from the new ONU.

5. The method of claim 4, wherein registering a new ONU using different synch times for receiving burst data from the new ONU, which are set differently according to whether a burst data start point of burst data to be received from the new ONU has been obtained from the new ONU includes:
   setting a first synch time for receiving burst data from the new ONU longer when an accurate burst data start point of burst data from the new ONU has not been obtained through the MPCP; and setting a second synch time for receiving burst data from the new ONU shorter when an accurate burst data start point of burst data from the new ONU has been obtained through the MPCP.

6. An apparatus for processing a burst data in an Ethernet passive optical network, comprising:
   an optical module for receiving burst data of different optical power levels from a plurality of optical network units (ONU) and converting an optical signal of the burst data to an electric signal;
   an access controller generating a multipoint control protocol (MPCP) loss of signal (LOS) signal, which signifies a period without an burst data optical signal, for reducing a synch time of the burst data received from the ONUs, the synch time being an allotted time during which an optical line terminal (OLT) recovers data from a received burst signal; and
   a serializer/deserializer (SerDes) unit for reducing the synch time when the MPCP LOS signal is generated, and recovering the received burst data by performing a code-group sort in a period where the MPCP LOS signal is not generated.

7. The apparatus of claim 6, wherein the access controller generates a MPCP RESET signal for reducing a level recovery time of the optical module and outputs the generated MPCP RESET signal to the optical module.

8. The apparatus of claim 6 or claim 7 wherein:
   the access controller checks the plurality of ONUs for a preset burst data transmission time of the respective ONUs, and obtains a start point at which a next burst data is to be received by the OLT after a previous burst data and a gap between the previous and next burst data, and
   the access controller generates the MPCP LOS signal using the gap between the previous and next burst data signals and the next burst data start point to determine a start point and duration of enabling the MPCP LOS signal.

9. The apparatus of claim 6, wherein the access controller sets synch times of a new ONU differently according to whether a burst data start point of burst data to be received from the new ONU has been obtained, and registers the same new ONU using the differently set synch times.

10. The apparatus of claim 9, wherein the access controller registers a new ONU by setting and exchanging a longer first synch time for receiving burst data from the new ONU when an accurate burst data start point of the burst data to be received from the new ONU has not been obtained through the MPCP and setting and exchanging a second synch time for receiving burst data from the new ONU that is shorter than the first synch time when an accurate burst data start point of the burst data to be received from the new ONU has been obtained through the MPCP.

* * * * *